Patented July 5, 1938

2,122,581

UNITED STATES PATENT OFFICE 2,122,581

PROCESS OF PREPARING PHENOLIC CONDENSATION PRODUCTS

Joseph B. Niederl, New York, N. Y.

No Drawing. Application June 11, 1935,
Serial No. 26,044

8 Claims. (Cl. 260—154)

This invention relates to methods for the preparation of phenolic or naphtholic condensation products containing reactive groups in the side chain.

More specifically, this invention relates to the preparation of alkylated phenols, naphthols, tetra hydro naphthols, in which the alkyl radical is unsaturated or carries halogen, hydroxyl, carbonyl, or carboxyl groups. The method of preparation involves carbon alkylation of a phenolic compound, having one free phenolic hydroxyl group, by condensing it with a halo hydrin in presence of a dehydrating agent.

Glycerol α,γ-dichloro hydrin is condensed with a phenol in presence of an anhydrous metal halide, such as zinc or magnesium chloride to yield 2-(hydroxy-phenyl)-1,3-di-chloro propane and 2-(hydroxy-phenyl)-3-chloro propene-1. Such isopropyl or isopropylene phenols with reactive halogen atoms in the side chain are extremely useful intermediates for a whole series of variously substituted phenols as follows:

Upon hydrolysis the corresponding phenolic propylene alcohols or α,γ-propylene glycols are produced. These phenolic glycols are distinguished by their solubility in water, and hence this reaction may be used to enhance the water solubility of phenols with high bactericidal action. When these di-halo isopropyl or mono-halo isopropenyl phenols are treated with either one or two moles of potassium cyanide, the corresponding hydroxy phenyl butyric acid or vinyl acetic acid nitrile or the corresponding hydroxy phenyl glutaric acid di nitriles are produced, which upon subsequent hydrolysis yield the corresponding hydroxy phenyl butyric, -vinyl acetic or glutaric acids.

In a similar manner these hydroxy phenyl di-halo propanes or hydroxy phenyl halo propenes can be treated with either one or two moles of the sodium derivative of either the plain or the substituted ethyl malonate or ethyl aceto acetate, or the silver salt of propiolic acid esters, to yield the corresponding hydroxy phenyl hexane dicarboxylic acids or hydroxy phenyl nonane tetra carboxylic acids, or the corresponding 1-halo-2-(hydroxy phenyl)-4-carboxy-hexanone-5, or the respective unsaturated acids.

These hydroxy phenyl di-halo propanes or hydroxy phenyl halo propenes furthermore can be easily reacted upon by either one or two moles of the mono metal salts of acetylene to yield 1-halo-2-(hydroxy phenyl) pentine-5, 2-(4-hydroxy phenyl) pentene-1-ine-5, or 4-(4-hydroxy phenyl) hepta-di-ine-1,7. With either one or two moles of vinyl magnesium bromide, or ethylene mono magnesium di-bromide, the corresponding 1-halo-2-(4-hydroxy-phenyl)pentene-1, 2-(4-hydroxy-phenyl) penta-di-ene-1,5, the 4-(4-hydroxy-phenyl) hepta-di-ene-1,7, or the 1,5-di-halo-2-(4-hydroxy-phenyl) pentane, 2-(4-hydroxy phenyl)-5-halo-pentene-1, or the 1,7-di-halo-4-(4-hydroxy-phenyl) heptane is obtained.

5-halo methyl-2-naphthalenes are produced from the above 1-halo-2-(4-hydroxy-phenyl) hexine-5-acid-6, or 1-halo-2-(4-hydroxy-phenyl) pentine-5, or 2-(4-hydroxy-phenyl) pentene-1-ine-5, by the addition of two moles of a hydrogen halide and subsequent ring closure, or by the addition of two atoms of a halogen to the above 1-halo-2-(4-hydroxy-phenyl) pentene-1, or 2-(4-hydroxy-phenyl) penta-di-ene-1,5 and subsequent ring closure. Substituted methyl tetra hydrohalo beta naphthols are produced from the above mentioned 1,5 - di - halo - 2 - (4 - hydroxy-phenyl) pentane by ring closure alone.

The halogen in either the halo methyl beta naphthol or the halo metyl tetra hydro beta naphthol is still very reactive and these compounds are, therefore, suitable for the preparation of a number of variously substituted beta naphthols or tetra hydro beta naphthols. Upon hydrolysis the 5-methylol beta naphthol or 5-methylol tetra hydro beta naphthol results. Treatment with potassium cyanide yields the 5-methyl cyano beta naphthol or its tetra hydro derivative, respectively, conventional hydrolysis of these nitriles then yields the corresponding beta naphthyl or tetra hydro beta naphthyl acetic acids. Interaction of the sodium derivative of either the plain or substituted malonic acid esters or aceto acetic acid esters results in the formation of beta naphthyl, or tetra hydro beta naphthyl malonic acid esters or aceto acetic acid esters.

As a special application of the above mentioned reactions is cited the interaction of either the chloro metyl beta naphthol or its tetra hydro derivative with the sodium derivative of a malonic acid ester in which the second methylenic hydrogen atom is substituted by 2-methyl-cyclo penta-dione-1,3, or 2-methyl-cyclo pentane diol-1,3, the latter compound being prepared by the interaction of methyl malonyl di-chloride with the di-sodium derivative of di-malonic acid ester, followed by elimination of the carboxyl group and interaction of the sodium salt of the resulting 2-methyl-cyclo penta-dione-1,3 with chloro or bromo malonic acid ester followed by the reduction of the carbonyl groups. The resulting compound of the first reaction is a di-substituted malonic acid ester containing as one substituent the 5-methyl beta naphthyl, or 5-methyl beta tetra hydro naphthyl radical, and as the second substituent the 2-methyl-cyclo penta-dione-1,3 or the 2-methyl-cyclo-pentane-diol-1,3, or both. Upon subsequent elimination of the carbonyl groups, followed by hydrogenation of one of the carbonyl groups, subsequent ring closure and final ring hydrogenation, compounds structurally identical with, or related to the sex hormones are formed.

This invention is not at all limited to the above cited cases, and is not only applicable to phenol itself but to any mono-, di-, or poly-alkylated phenol, containing one free phenolic hydroxyl group and at least one position, either para or ortho to the phenolic hydroxyl group, open for reaction. Thus the cresols, xylenols, thymol, carvacrol, p-tertiary octyl phenol, or the alkoxy derivatives of the di- and tri-hydroxy benzenes, such as guaiacol, the di-methyl ethers of pyrogallol, or phloroglucinol can be used, as well as alpha or beta naphthol.

The halohydrins include aliphatic mono-, di- and poly-halogen compounds containing one free hydroxyl group, preferably secondary or tertiary, and include such compounds as: glycerol-$\alpha,\gamma$-di-chloro hydrin, glycerol-$\alpha,\gamma$-di-bromo hydrin, and similar types of compounds.

*Example 1.*—Preparation of the 1,3-di-chloro-2-(4-hydroxy-phenyl) propane and 1-chloro-2-(4-hydroxy-phenyl) propene-3. To a molar mixture of phenol and glycerol $\alpha,\gamma$-di-chloro hydrin (B. P.: 176° C.) one mole of anhydrous, powdered zinc chloride is added and the mixture rapidly heated to 180° C. After ten minutes the temperature is reduced to 125–130° C. and the reaction mixture kept at this temperature for an additional hour. The mixture, while still warm, is poured into ten times its volume of warm water and thoroughly shaken. This washing procedure is repeated several times. The resulting phenolic oil is then separated and steam distilled, or dried and distilled in vacuo. B. P.: 110–120° C. at 3 mm. pressure.

The dimer of the 1-chloro-2-(4-hydroxy-phenyl) propene-3 is always formed at the same time. The monomeric 1-chloro-2-(4-hydroxy-phenyl) propene-3 is obtained upon pyrolysis of the dimer. This compound can be converted into a di-halo-2-(4-hydroxy-phenyl) propane by the addition of the appropriate hydrogen halide.

In a similar manner any mono-, di-, or poly-alkyl or alkoxy phenol or naphthol may be condensed with glycerol $\alpha,\gamma$-di-chloro hydrin or any other halo hydrin.

*Example 2.*—Reactions of the 1,3-di-chloro-2-(4-hydroxy-phenyl) propane and 1-chloro-2-(4-hydroxy-phenyl) propene-3.

(a) *Hydrolysis.*—Any of the above compounds is refluxed with an excess aqueous alkali and the solution is acidified with a mineral acid. Salt may be added to facilitate the separation. The mixture may be extracted with ether or separated directly. Upon oxidation of the mono acylated derivative of the 2-(4-hydroxy-phenyl) propylene glycol and subsequent hydrolysis, the 4-hydroxy phenyl malonic acid results, which upon distillation yields the 4-hydroxy phenyl acetic acid.

(b) *Carboxylations.*—To an alcoholic solution containing either one or two moles of potassium cyanide an alcoholic solution containing one mol. of the 1,3-di-chloro-2-(4-hydroxy-phenyl) propane, or of the 1-chloro-2-(4-hydroxy-phenyl) propene-3 is slowly added and the reaction mixture refluxed for several hours. The mono- or the di-nitrile is then isolated by pouring the reaction mixture into water, whereby the reaction product separates.

To a suspension in alcohol or benzene of either one or two moles of the sodium derivative of either plain or substituted malonic acid ester or aceto acetic acid ester, an alcoholic solution containing one mol. of the 1,3-di-chloro-2-(4-hydroxy-phenyl) propane, or 1-chloro-2-(4-hydroxy-phenyl) propene-3 is slowly added and the mixture refluxed for several hours. The reaction products may then be purified by the conventional methods.

(c) *Alkylations.*—To a suspension in an organic solvent either one mol. or two moles of the mono silver acetylene-silver chloride compound, or the acetylene mono magnesium bromide, one mol. of the 1,3-di-chloro-2-(4-hydroxy-phenyl) propane, or 1-chloro-2-(4-hydroxy-phenyl) propene-3 or their acetates, is slowly added and the mixture then refluxed for several hours. To a solution of one mol. of vinyl bromide or of ethylene di-bromide in absolute ether one gram atomic weight of magnesium is slowly added and the reaction allowed to proceed until all the magnesium has been dissolved. To the resulting solution of the Grignard compound in ether one mol. or half of a mol. of the 1,3-di-chloro-2-(4-hydroxy-phenyl) propane, or one mol. of the 1-chloro-2-(4-hydroxy-phenyl) propene-3 in ether solution is slowly added and the reaction mixture finally allowed to reflux. From the reaction mixture the ether is first removed by distillation and the residue repeatedly washed with water and subjected to distillation in high vacuum.

(d) *Additions.*—To the 1-chloro-2-(4-hydroxy-phenyl) propene-3, or still better its acyl derivative, halogen can be added to form the 1,2,3-tri-halo-2-(4-hydroxy-phenyl) propane, a compound which upon hydrolysis yields a phenolic glycerine, suitable for the synthesis of phenolic carbohydrates.

*Example 3.*—Preparation of the 5-chloro methy-2-hydroxy naphthalene and the 5-chloro methyl-2-hydroxy tetra hydro naphthalene.

(a) Into a molar solution in glacial acetic acid of the 1-chloro-2-(4-hydroxy-phenyl) pentine-5, or 2-(4-hydroxy-phenyl) pentene-1-ine-5, or 1-chloro-2-(4-hydroxy-phenyl)-hexine-5-acid-6, an excess of hydrogen bromide gas is introduced, preferably under pressure. The resulting 1-chloro-4,5-di-bromo or 1,4,5-tri-bromo-2-(4-hydroxy-phenyl) pentane, or 1,4,5-tri-halo-2-(4-hydroxy-phenyl) hexanoic acid-6 after removal of the solvent, is subjected to distillation to effect ring closure.

(b) 1-chloro-5-bromo or 1,5-di-bromo-2-(4-hydroxy-phenyl) pentane is subjected to ring closure by heating this compound with a metal halide in the conventional manner.

(c) The 1-chloro-5-bromo-2-(4-hydroxy-phenyl) pentane, or the 5-bromo-2-(4-hydroxy-phenyl) pentene-1, is first treated with alcoholic potassium hydroxide solution to form the 2-(4-hydroxy-phenyl) penta-di-ene-1,5. To this compound, or still better its acetate, 2 mols of halogen are added to form 1,2,4,5-tetra-halo-2-(4-hydroxy-phenyl) pentane. This compound upon distillation undergoes ring closure with the formation of a halogenated methyl beta naphthol.

The resulting halo methyl beta naphthols, or their tetra hydro derivatives, are purified by distillation with steam or in vacuo, by sublimation or by recrystallization.

*Example 4.*—Reactions of the 5-chloro methyl-2-hydroxy naphthalene or the 5-chloro methyl-2-hydroxy tetra hydro naphthalene.

(*a*) *Hydrolysis.*—Any one of the above compounds is refluxed with an excess aqueous alkali and the solution is acidified with a mineral salt. Salt may be added to facilitate the separation. Oxidation of the mono acyl derivative yields upon subsequent hydrolysis 2-hydroxynaphthoic acid-5, or its tetra hydro derivative, respectively.

(*b*) *Carboxylations.*—To an alcoholic solution containing one mol. of potassium cyanide an alcoholic solution of the 5-chloro methyl-2-hydroxy naphthalene, or its tetra hydro derivative, is slowly added and the resulting mixture refluxed for several hours. Upon the addition of water the cyano methyl beta naphthol or its tetra hydro derivative separates.

To a suspension in alcohol or benzene containing one mol. of the sodium salt of either the plain or a substituted malonic acid ester, or aceto acetic acid ester, an alcoholic solution of the 5-chloro methyl β-naphthol or its tetra hydro derivative is slowly added and the mixture finally refluxed for several hours. After removal of the solvents the plain methyl beta naphthyl malonic acid ester, or aceto acetic acid esters, or the further substituted methyl beta naphthyl malonic acid esters, or aceto acetic acid esters, or their tetra hydro derivatives are isolated.

To a solution of one mol. of a Grignard compound in absolute ether one mol. of the 5-halo methyl beta naphthol or its tetra hydro derivative is slowly added and the mixture finally refluxed. The ether is then removed by distillation and the reaction product first washed with water, then dried and distilled in vacuo.

What I claim is:

1. A process for the preparation of substituted phenols which comprises reacting on a halohydrin with a phenol free of active substituents and having a reactive nuclear hydrogen atom, in the presence of a metal halide capable of splitting out water.

2. A process for the preparation of substituted phenols which comprises reacting on a halohydrin with a phenol free of active substituents and having a reactive nuclear hydrogen atom, in the presence of zinc chloride at 100° to 250° C.

3. A process for the preparation of substituted phenols which comprises reacting on glycerol α,γ-dichlorhydrin with a phenol free of active substituents and having a reactive nuclear hydrogen atom, in the presence of zinc chloride at 100° to 250° C.

4. Phenolic products having the structural formula

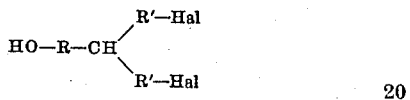

wherein R represents an aromatic group nuclearly attached to the

R' an alkylene radical and Hal a halogen atom.

5. Phenolic products having the structural formula

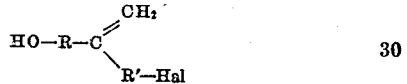

wherein R represents an aromatic group nuclearly attached to the

R' an alkylene radical and Hal a halogen atom.

6. 1,3-dichloro-2(hydroxy alkyl phenyl) propanes.

7. 1, halo-2(hydroxyl alkyl phenyl) propenes-3.

8. Nuclear substituted phenols obtained by condensing glycerol dichlorohydrin and a phenol free of active substituents and having a reactive nuclear hydrogen atom.

JOSEPH B. NIEDERL.